(12) United States Patent
Tran et al.

(10) Patent No.: US 7,410,626 B2
(45) Date of Patent: Aug. 12, 2008

(54) LAYERED AMMONIA OXIDATION CATALYST

(75) Inventors: Pascaline Harrison Tran, Holmdel, NJ (US); James Mon-Her Chen, North Brunswick, NJ (US); Gerard Diomede Lapadula, Piscataway, NJ (US); Marc Thomas Blute, East Brunswick, NJ (US)

(73) Assignee: BASF Catalysts LLC, Iselin, NJ (US)

( * ) Notice: Subject to any disclaimer, the term of this patent is extended or adjusted under 35 U.S.C. 154(b) by 918 days.

(21) Appl. No.: 10/659,159

(22) Filed: Sep. 10, 2003

(65) Prior Publication Data

US 2005/0054524 A1    Mar. 10, 2005

(51) Int. Cl.
*C01B 21/02* (2006.01)
*B01J 23/42* (2006.01)

(52) U.S. Cl. .................. 423/351; 502/334; 502/339

(58) Field of Classification Search ............ 502/334, 502/339; 423/351
See application file for complete search history.

(56) References Cited

U.S. PATENT DOCUMENTS

| | | | |
|---|---|---|---|
| 3,947,554 A | 3/1976 | Senes et al. ............. 423/403 |
| 4,077,913 A * | 3/1978 | Acres et al. ............. 502/302 |
| 4,179,412 A | 12/1979 | Inaba et al. ............. 252/472 |
| 4,617,289 A * | 10/1986 | Saito et al. ............. 502/339 |
| 5,024,981 A | 6/1991 | Speronello et al. ......... 502/67 |
| 5,122,497 A | 6/1992 | Cresswell et al. .......... 502/330 |
| 5,336,656 A | 8/1994 | Campbell ................ 502/329 |
| 5,690,900 A | 11/1997 | Smojver ................. 423/392 |
| 6,165,435 A | 12/2000 | Echegaray et al. ......... 423/392 |
| 6,380,128 B1 | 4/2002 | Ji et al. ................. 502/340 |
| 6,489,264 B1 | 12/2002 | Isupova et al. ........... 502/302 |
| 6,660,683 B1 * | 12/2003 | Yaluris et al. ............ 502/241 |
| 6,677,264 B1 * | 1/2004 | Klein et al. .............. 502/74 |
| 6,764,665 B2 * | 7/2004 | Deeba et al. ........... 423/239.1 |
| 6,849,572 B2 * | 2/2005 | Hwang et al. ............ 502/325 |
| 7,022,646 B2 * | 4/2006 | Li ....................... 502/339 |
| 2003/0124046 A1 | 7/2003 | Gorywoda et al. ......... 423/403 |

FOREIGN PATENT DOCUMENTS

| | | |
|---|---|---|
| EP | 0 835 686 A2 | 4/1998 |
| JP | 02160047 | 6/1990 |
| JP | 00140640 | 5/2000 |

* cited by examiner

*Primary Examiner*—Wayne A. Langel
(74) *Attorney, Agent, or Firm*—Melanie L. Brown; Bronwen B. Loeb; Drinker Biddle

(57) ABSTRACT

The invention pertains to a layered ammonia oxidation catalyst. The layered catalyst causes ammonia to be selectively oxidized in the presence of an oxidant such as air, while minimizing the formation of nitrogen oxides ($NO_x$). The layered catalyst comprises a refractory oxide support such as gamma alumina upon which a platinum component is deposited and a vanadia component is deposited on the platinum. The catalyst is preferably disposed on a substrate such as a metal foil whose surface contains a "herringbone" pattern.

20 Claims, No Drawings

LAYERED AMMONIA OXIDATION CATALYST

FIELD OF THE INVENTION

The invention relates to a layered ammonia oxidation catalyst. More particularly, the invention relates to the catalyst, a method for preparing such catalyst and to a process utilizing such catalyst wherein ammonia ($NH_3$) is selectively oxidized to nitrogen ($N_2$) while minimizing the formation of nitrogen oxides ($NO_x$).

BACKGROUND OF THE INVENTION

Stationary sources of air pollution, e.g., electric power generating plants, produce exhaust gas streams that contain levels of $NO_x$ in excess of those permitted under Federal and State air quality regulations, even where the power plants utilize natural gas as the fuel (thereby avoiding emitting unburned hydrocarbons that would otherwise occur when the fuel consists of oil or coal). Typically, such plants reduce the $NO_x$ in the exhaust gas streams to $N_2$ by injecting ammonia into the exhaust gas stream in the presence of a selective catalytic reduction ("SCR") catalyst typically consisting of vanadia disposed on titania. Although the resultant gas stream contains levels of $NO_x$ below the maximum permitted under such regulations, the reaction that utilizes ammonia as the reducing agent also results in emissions of ammonia above that permitted under such regulations. Therefore, a further catalytic reaction is required wherein $NH_3$ in the exhaust gas stream is selectively oxidized to $N_2$ without the formation of amounts of $NO_x$ that would otherwise raise the level of $NO_x$ above that permitted by such regulations.

Typically, prior art ammonia oxidation catalysts not only cause the oxidation of $NH_3$ to $N_2$, but they also catalyze the oxidation of $NH_3$ to $NO_x$. Indeed, most prior art ammonia oxidation catalysts are designed to oxidize ammonia to nitrites and nitrates in order to produce useful quantities of nitric acid ($HNO_3$). Typical prior art ammonia oxidation catalysts are described in the following exemplary U.S. Pat. Nos. 5,122,497; 5,336,656; 5,690,900; 6,165,435; 6,380,128; 6,489,264; and published U.S. patent application Ser. No. US2003/0124046.

OBJECTS OF THE INVENTION

It is an object of the invention to provide a catalyst that will selectively oxidize ammonia to nitrogen with minimal formation of nitrogen oxides.

It is a further object of the invention to provide a process to treat exhaust gas streams containing undesirable quantities of ammonia in a manner such that the ammonia is oxidized to nitrogen with minimal formation of nitrogen oxides.

SUMMARY OF THE INVENTION

The invention relates to a layered ammonia oxidation catalyst that selectively oxidizes ammonia to nitrogen with minimal formation of nitrogen oxides.

The invention also relates to a process for preparing the layered ammonia oxidation catalyst.

The invention further relates to a process for treatment of an exhaust gas stream containing ammonia so as to selectively oxidize the ammonia to nitrogen that involves contacting the stream with an oxidant such as air in the presence of the layered ammonia oxidation catalyst of the invention.

DETAILS OF THE INVENTION

The layered ammonia oxidation catalyst of the invention comprises a refractory metal oxide, a layer of platinum disposed upon the refractory metal oxide and a layer of vanadia disposed upon the platinum. As used in the process of the invention, the catalyst will be disposed on a substrate that typically will be a metal or a refractory ceramic.

The refractory metal oxide comprises a high surface area refractory metal oxide such as alumina, silica, titania and zirconia and mixtures thereof. The refractory metal oxide may consist of or contain a mixed oxide such as silica-alumina, aluminosilicates which may be-amorphous or crystalline, alumina-zirconia, alumina-chromia, alumina-ceria and the like. The preferred refractory metal oxide comprises gamma alumina having a surface area of about 60 to about 300 $m^2/g$.

The platinum is typically present in an amount of about 0.5 to about 4 wt. %, based on the weight of the refractory metal oxide. Preferably, the platinum will be present in an amount of about 10 to about 100 $g/ft^3$, most preferably 30 to 80 $g/ft^3$.

The vanadia is typically present in an amount of about 0.5 to about 4 wt. %, based on the weight of alumina. Preferably, the vanadia will be present in an amount of about 13 to about 104 $g/ft^3$, most preferably 50 to 80 $g/ft^3$.

The layered ammonia oxidation catalyst is readily prepared by first depositing the refractory metal oxide onto a substrate such as a metal or a ceramic. The substrate may be any of those materials typically used for preparing exhaust gas treatment catalysts and will preferably comprise a metal or refractory ceramic having a honeycomb structure. Any suitable substrate may be employed, such as a monolithic substrate of the type having a plurality of fine, parallel gas flow passages extending therethrough from an inlet or an outlet face of the carrier, such that passages are open to fluid flow therethrough. The passages that are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

The substrates useful for the layered ammonia oxidation catalyst of the invention are preferably metallic in nature and may be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalyst components to the carrier.

The preferred substrate upon which the layered ammonia oxidation catalyst of the invention is disposed comprises an iron-chromium alloy, typically referred to as "FeCrAlloy", in the form of a foil having a thickness of about 0.0254 to about 0.051 mm and having a "herringbone" pattern imposed upon its surface. After all of the catalytic components have been deposited on the foil and the foil has been calcined, it is folded- and inserted in an open-ended container, e.g., a stainless steel or "FeCrAlloy" tube (cylindrical or polygonal) for use in carrying out the ammonia oxidation process of the invention.

The layered ammonia oxidation catalyst of the invention is readily prepared by the following method:

1. The selected refractory metal oxide, e.g., gamma-alumina in the form of an aqueous slurry containing about 30 to about 40 wt. % gamma-alumina, is deposited, i.e., coated, upon the surface of the selected substrate, e.g., a "FeCrAlloy" foil having a herringbone pattern impressed upon its surface. The coating of the surface of the substrate is readily accomplished by dipping the substrate in the aqueous slurry.

2. The coated substrate is dried, e.g., at a temperature of about 80 to about 130° C. for about 3 to about 12 hours. Preferably, the dried, coated substrate is thereafter calcined at a temperature of about 300 to about 700° C. for about 0.5 to about 4 hours.

3. The platinum component is thereafter deposited upon the surface of the coated substrate resulting from step 2. Typically, the platinum component is utilized in the form of a compound or complex to achieve dispersion of the component on the refractory metal oxide support, e.g., gamma-alumina. The deposition of the platinum component is preferably accomplished by spraying the surface of the substrate resulting from step 2 with an aqueous solution of the platinum component.

For the purposes of the present invention, the term "platinum component" means any compound, complex, or the like which, upon calcination or use thereof, decomposes or otherwise converts to a catalytically active form, usually the metal or the metal oxide. Water-soluble compounds or water-dispersible compounds or complexes of the platinum metal may be used as long as the liquid medium used to impregnate or deposit the platinum metal onto the refractory metal oxide support does not adversely react with the platinum metal or its compound or its complex or other components which may be present in the catalyst composition and is capable of being removed from the metal component by volatilization or decomposition upon heating and/or application of a vacuum. For example, suitable compounds are chloroplatinic acid, amine-solubilized platinum hydroxide, platinum nitrate, and the like.

4. The substrate resulting from step 3 is dried, e.g., at a temperature of about 80 to about 130° C. for about 6 to about 12 hours and is thereafter calcined at a temperature of about 300 to about 700° C. for about 12 to about 24 hours.

5. The substrate resulting from step 4 is treated with an aqueous solution of a vanadium compound such as ammonium metavanadate or vanadium oxalate.

6. The substrate resulting from step 5 is dried, e.g., at a temperature of about 80 to about 130° C. for about 6 to about 12 hours and is thereafter calcined at a temperature of about 300 to about 700° C. for about 12 to about 24 hours.

As mentioned above, exhaust gas streams, particularly those emitted from stationary sources such as natural gas-fueled electrical generating plants, will contain ammonia in amounts in excess of that permitted under current state and federal air quality regulations. Such excess ammonia results from injection of an ammonia stream into the exhaust gas stream in the presence of an SCR catalyst in order to reduce the level of nitrogen oxides in the gas stream to nitrogen such that the treated exhaust gas stream will contain a level of nitrogen oxides below the maximum level permitted by current state and federal air quality regulations. It is therefore necessary to further treat the exhaust gas stream to reduce the amount of ammonia to a level below the maximum permitted by such regulations without concomitantly significantly increasing the amount of nitrogen oxides in the exhaust gas stream before it is released into the atmosphere.

The exhaust gas stream that exits the SCR catalyst bed will typically contain about 5 to about 20 ppm of ammonia, about 5 to about 50 ppm of carbon monoxide, about 5 to about 15% of carbon dioxide, about 5 to about 15 wt. % of water (in the form of steam) and about 70 to about 90 wt. % of air such that the overall oxygen level is at least about 14 wt. %. In the process of the invention, the ammonia in the gas stream will be selectively oxidized to nitrogen by the oxygen in the air in the presence of the layered ammonia oxidation catalyst of the invention in accordance with the following reaction:

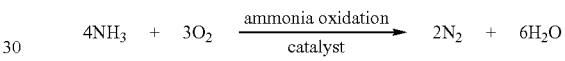

$$4NH_3 + 3O_2 \xrightarrow{\text{ammonia oxidation catalyst}} 2N_2 + 6H_2O$$

Any carbon monoxide present in the exhaust gas stream will be concurrently oxidized to carbon dioxide in accordance with the following reaction:

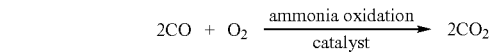

$$2CO + O_2 \xrightarrow{\text{ammonia oxidation catalyst}} 2CO_2$$

The process of the invention for selectively oxidizing the ammonia in the gas stream to nitrogen comprises contacting the ammonia-containing exhaust gas stream with the layered ammonia oxidation catalyst of the invention (as fully described above) in the presence of an oxidant at a temperature of about 200 to about 375° C., preferably 200 to 300° C. The oxidant is typically oxygen in the form of air that is already present in the exhaust gas stream to be treated. However, if necessary, a supplemental supply of air may be injected into the exhaust gas stream in order to insure that the oxygen content during the reaction will be at least 10 wt. %.

The following nonlimiting examples shall serve to illustrate the embodiments of this invention.

EXAMPLE 1

Preparation of the Ammonia Oxidation Catalyst

A "FeCrAlloy" foil having a thickness of 0.051 mm and a herringbone pattern impressed upon its surface was dipped into an aqueous slurry of 30 wt. % gamma alumina having a surface area of 150 m²/g. After several minutes, the foil was removed from the aqueous slurry and dried at 110° C. for 8 hours and thereafter calcined at 500° C. for 2 hours. The gamma alumina-coated metal foil was then dipped in an aqueous solution of 10 wt. % amine-solubilized platinum hydroxide for several minutes, dried at 110° C. for 8 hours and thereafter calcined at 500° C. for 16 hours. The resultant platinum-impregnated alumina catalyst contained 60 g/ft³ of platinum.

The platinum-impregnated alumina catalyst was then dipped into an aqueous solution of 5 wt. % ammonium metavanadate for several minutes, dried at 110° C. for 8 hours and thereafter calcined at 500° C. for 16 hours. The resultant layered vanadia-platinum-alumina catalyst contained 65 g/ft³ of vanadia. Thereafter, 0.6 feet of the finished catalyst foil was folded and placed within an open-ended stainless steel tube having a wall thickness of 0.79 mm, a length of 6.25 inches and a diameter of 0.75 inches.

EXAMPLE 2

Preparation of Comparative Catalysts

Catalysts typically used for ammonia oxidation reactions were prepared in the same manner as that described above, with the exception that the substrate was cordierite rather than a metal foil. Further, as noted below, supports other than gamma alumina were utilized in some cases. The components and preparatory procedures for the comparative examples were as follows:

Comparative Catalyst A: 60 g of Pt and 0.44 g BaO are deposited on gamma alumina that had been deposited on cordierite.

Comparative Catalyst B: 60 g of Pt and 1 wt. % rhodium are deposited on gamma alumina that had been deposited on cordierite.

Comparative Catalyst C: 60 g of Pt and 0.58 g SrO are deposited on gamma alumina that had been deposited on cordierite.

Comparative Catalyst D: 60 g of Pt and 0.88 g $CeO_2$ are deposited on gamma alumina that had been deposited on cordierite.

Comparative Catalyst E: 60 g of Pt and 0.62 g MnO are deposited on gamma alumina that had been deposited on cordierite.

Comparative Catalyst F: 38 g/ft³ Pt deposited on gamma alumina that had been deposited on cordierite.

Comparative Catalyst G: 80 g/ft³ Pt deposited on a support consisting of Zr—Si that had been deposited on cordierite.

Comparative Catalyst H: 80 g/ft³ Pt deposited on a support consisting of Ti that had been deposited on cordierite.

Comparative Catalyst I: A mixture of 24 g/ft³ Pt and 6 g/ft³ Pd deposited on gamma alumina that had been deposited on cordierite.

Comparative Catalyst J: 15 g/ft³ Pt deposited on a support consisting of Ti that had been deposited on cordierite.

Comparative Catalyst K: 3.3 wt. % vanadia deposited on 19 g/ft³ Pt deposited on a support consisting of Mn-Zr that had been deposited on cordierite.

Comparative Catalyst L: 2 g/ft³ Pt deposited on a mixture of gamma alumina and ceria (50:50) that had been deposited on cordierite.

EXAMPLE 3

Evaluation of the Performance of the Layered Ammonia Oxidation Catalyst of Example 1 versus that of Comparative Catalysts A-L The performance of each of the catalysts of Examples 1 and 2 was evaluated using a gas stream containing 1.3 ppm $NO_x$, 300 ppm CO, 15 ppm $NH_3$, 10% $H_2O$, 10% $O_2$ and 80% $N_2$. The gas stream was flowed over each catalyst at a space velocity of 70,000 VHSV while maintaining a reaction temperature of 275° C. The inlet and outlet ppm amounts of $NO_x$, CO and $NH_3$ were measured with a "1312 Multi-Gas Analyzer" (California Instruments, San Diego, Calif.). The percent conversions of the $NH_3$ and CO were calculated as follows:

% Conversion=inlet ppm−outlet ppm/inlet ppm×100

The % conversions of the $NH_3$ and CO as well as the outlet ppm of the $NO_x$ for each catalyst are set forth in Table I below:

TABLE I

| Catalyst | $NH_3$ Conversion, % | CO Conversion, % | Outlet ppm $NO_x$ |
|---|---|---|---|
| Example 1 | 94 | 98 | 2.4 |
| Catalyst A | 80.44 | 97.3 | 4.4 |
| Catalyst B | 97.73 | 97.43 | 5.6 |
| Catalyst C | 56 | 53.65 | 4.5 |
| Catalyst D | 92.05 | 97.43 | 3.4 |
| Catalyst E | 83.87 | 98 | 3.4 |
| Catalyst F | 91 | 96 | 5.9 |
| Catalyst G | 95.56 | 99.66 | 3.70 |
| Catalyst H | 90 | 97.80 | 4.45 |
| Catalyst I | 84 | 87 | 3.90 |
| Catalyst J | 71 | 94 | 5.25 |
| Catalyst K | 79 | 98 | 6.25 |
| Catalyst L | 79 | 90 | 7.20 |

As may be seen from the results set forth in Table I, the ammonia oxidation catalyst of the invention (Example 1) resulted in the lowest $NO_x$ formation without sacrificing $NH_3$ and CO conversion efficiency.

Although the invention has been described with reference to specific embodiments, such embodiments are intended to be illustrative and not exhaustive of embodiments within the spirit and the scope of the invention.

What is claimed is:

1. A layered ammonia oxidation catalyst comprising a refractory metal oxide, a layer of platinum disposed upon the refractory metal oxide and a layer of vanadia disposed upon the platinum, wherein said vanadia is present in the amount of about 13 to about 104 g/ft³.

2. The catalyst of claim 1 that is disposed upon a substrate.

3. The catalyst of claim 2 wherein the substrate comprises a "FeCrAlloy" foil having a herringbone pattern impressed upon its surface.

4. The catalyst of claim 2 wherein the substrate comprises a refractory ceramic having a honeycomb structure.

5. The catalyst of claim 1 wherein the refractory metal oxide comprises gamma-alumina having a surface area of about 60 to about 300 m²/g.

6. The catalyst of claim 1 wherein the platinum is present in an amount of about 0.5 to about 4 wt. %, based on the weight of the refractory metal oxide.

7. The catalyst of claim 6 wherein the platinum is present in the amount of about 10 to about 100 g/ft³.

8. A method for preparing an ammonia oxidation catalyst that comprises the steps of:
   (a) depositing a refractory metal oxide upon the surface of a substrate;
   (b) depositing a platinum component upon the surface of the substrate resulting from step (a);
   (c) drying and thereafter calcining the substrate resulting from step (b) at a temperature of about 300 to about 700° C.;
   (d) depositing a vanadium component upon the surface of the substrate resulting from step (c); and
   (e) drying and thereafter calcining the substrate resulting from step (d) at a temperature of about 300 to about 700°

C. so as to form vanadia, wherein said vanadia is present in the amount of about 13 to about 104 g/ft$^3$.

9. The method of claim 8 wherein the substrate comprises a "FeCrAlloy" foil having a herringbone pattern impressed upon its surface.

10. The method of claim 8 wherein the substrate comprises a refractory ceramic having a honeycomb structure.

11. The method of claim 8 wherein the refractory metal oxide comprises gamma-alumina surface area of about 60 to about 300 m$^2$/g.

12. The method of claim 8 wherein the substrate resulting from step (a) is dried and thereafter calcined at a temperature of about 300 to about 700° C. before carrying out step (b).

13. The method of claim 8 wherein in step (a), the refractory metal oxide is deposited upon the surface of the substrate by dipping the substrate into an aqueous slurry of the refractory metal oxide.

14. The method of claim 8 wherein in step (b), the platinum component is deposited on the substrate resulting from step (a) by spraying the surface of such substrate with an aqueous solution of the platinum component.

15. The method of claim 14 wherein the platinum component is utilized in the form of an aqueous solution of an amine-solubilized platinum hydroxide.

16. The method of claim 8 wherein in step (d), the vanadium component is deposited onto the surface of the substrate resulting from step-(c) by dipping said substrate into an aqueous solution of the vanadium component.

17. The method of claim 16 wherein the vanadium component is utilized in the form of an aqueous solution of ammonium metavanadate.

18. A process for selectively oxidizing ammonia present in an exhaust gas stream to nitrogen which comprises contacting the exhaust gas stream with a layered ammonia oxidation catalyst in the presence of an oxidant at a temperature of about 200 to about 375° C., said layered ammonia oxidation catalyst comprising a refractory metal oxide, a layer of platinum disposed upon the refractory metal oxide and a layer of vanadia disposed upon the platinum, wherein said vanadia is present in the amount of about 13 to about 104 g/ft$^3$.

19. The process of claim 18 wherein the oxidant comprises a gaseous stream containing at least about 10 wt. % oxygen.

20. The process of claim 19 wherein the gaseous stream comprises air.

* * * * *